United States Patent
Yamaguchi et al.

(10) Patent No.: US 6,592,959 B2
(45) Date of Patent: *Jul. 15, 2003

(54) ENCODER MADE OF RUBBER MATERIAL AND METHOD OF MANUFACTURING THEREOF

(75) Inventors: Yoshihiko Yamaguchi, Okayama (JP); Yasuo Taniguchi, Okayama (JP)

(73) Assignee: Uchiyama Manufacturing Corp., Okayama (JP)

(*) Notice: Subject to any disclaimer, the term of this patent is extended or adjusted under 35 U.S.C. 154(b) by 56 days.

This patent is subject to a terminal disclaimer.

(21) Appl. No.: 09/944,342

(22) Filed: Sep. 4, 2001

(65) Prior Publication Data

US 2002/0027192 A1 Mar. 7, 2002

(30) Foreign Application Priority Data

Sep. 4, 2000 (JP) .................................. 2000-266543

(51) Int. Cl.$^7$ .................. B32B 25/02; B29C 35/02; G01B 7/00
(52) U.S. Cl. .............. 428/66.6; 264/138; 264/153; 264/405; 264/437; 324/200; 324/207.11; 324/207.22; 156/308.2
(58) Field of Search ............... 428/66.6; 264/109, 264/128, 405, 437, 138, 153; 156/308.2, 307.1, 307.7, 250; 324/200, 207.22, 207.11

(56) References Cited

U.S. PATENT DOCUMENTS 2,999,275 A    9/1961  Blume, Jr.
3,277,524 A *  10/1966 Silver .................. 425/174

FOREIGN PATENT DOCUMENTS

JP    10-332427    12/1998

* cited by examiner

Primary Examiner—Stephen J. Lechert, Jr.
(74) Attorney, Agent, or Firm—Wenderoth, Lind & Ponack, L.L.P.

(57) ABSTRACT

An encoder made of rubber material in which the S-poles and the N-poles are alternately magnetized in circumference, whose magnetic force is strong and whose variation of the magnetic force is slight in the circumferential direction when it is magnetized. And a manufacturing method thereof. A ring shaped rubber compound made of unvulcanized rubber material into which magnetic powders are mixed and having thickness t1 of 1.5 times to 5 times thicker than the thickness t of the encoder made of rubber material as the final product is vulcanizingly molded. In this vulcanizingly molding process, the thickness of ring shaped rubber compound is reduced to one fifth (⅕) to two thirds (⅔) by compressing the ring shaped rubber compound in the axial direction under high temperature. And then, vulcanizingly molded one is magnetized S-poles and N-poles alternately in circumference.

17 Claims, 3 Drawing Sheets

ENCODER MADE OF RUBBER MATERIAL AND METHOD OF MANUFACTURING THEREOF

BACKGROUND OF THE INVENTION

1. Field of the Invention

The present invention relates to an encoder made of rubber material on which the S-poles and the N-poles are alternately magnetized in circumference, and a method of manufacturing the said encoder. More particularly, the present invention relates to an encoder as the before described, and, its magnetic force is strong when it is magnetized and variation and/or irregularity of magnetism in the circumferential direction of it is slight. Also the present invention relates to a method of manufacturing the said encoder.

2. Description of the Related Art

Conventionally, an encoder made of rubber material and having a magnetism has been manufactured as follows: first, an appropriate amount of magnetic powders such as ferrites are mixed into rubber material, and unvulcanized rubber compound in a sheet shape is formed by roll sheeting process using the said mixture. Next, this unvulcanized rubber compound in a sheet shape is cut into square rubber thread like a slit. This square rubber band is formed into a rubber band ring by temporarily joining the opposite ends of it together. Then, this rubber band ring is compression-molded and vulcanizingly molded from the upward and downward directions using a mold. And the S-poles and the N-poles are alternately magnetized in circumference onto this vulcanizingly molded rubber ring.

An encoder made of rubber material and having a magnetism manufactured by the above-described conventional manufacturing method has problems such as those described as follows:

When the rubber band ring is formed by temporarily joining the opposite ends of square rubber band, which was cut like a slit from sheet shaped rubber compound, the said rubber band ring is made from unvulcanized rubber compound made by mixing magnetic powders and rubber material with a little considering about the arrangement and alignment of the magnetic powders. Therefore, the vulcanizingly molded rubber ring, which was obtained by compression-molding and vulcanizingly molding the said rubber band ring causes the malfunction that the magnetic force vanes in the circumferential direction when the S-poles and the N-poles are alternately magnetized in a circumference. As a result, it was difficult to obtain an encoder made of rubber material and having a magnetism, which can produce uniform and powerful magnetic forces anywhere in the circumferential direction when it is magnetized.

Avoiding such a default, another formative method has been employed. In this formative method, unvulcanized rubber compound containing magnetic powders is formed into a thin sheet shape using a roller or an extruder for the purpose of enhancing the degree of orientation of magnetism, and a rubber band ring is formed by punching this sheet in a ring shape.

According to this method, it is possible that the arrangement of magnetic powders such as ferrites or the like is made to hold the directional orientation. Moreover, there are no joining portions, which is made by joining the opposite ends of square rubber band and making the direction of arrangement of the magnetic powders to be irregular. Therefore, one has found satisfaction to some extent.

However, in this method, it is necessary to make the sheet shaped rubber compound comparatively thin in order to enhance the degree of orientation of the magnetic powders in the process in which the sheet shaped rubber compound is formed by rolling or extruding using a roller or an extruder. Therefore, in any way, the extrusion of a sheet is troublesome. Moreover, also in the molding, many malfunctions such as the case where a plurality of sheets being superimposed has to be inputted into the roller or the extruder and the like have been occurred.

Furthermore, during the extrusion of a thin sheet, it easily engages a wrinkle, a bubble or the like. So that, when it is compression-molded, there has been a problem that the orientation of magnetism is easily dislocated.

SUMMARY OF THE INVENTION

The present invention has been made in consideration of the before described circumstances. And an object of the present invention is to provide an encoder made of rubber material and having a magnetism which can be manufactured in a simplified manufacturing step and, when the S-poles and the N-poles are alternately magnetized in circumference, whose magnetic force is strong and which exerts approximately uniform magnetism at any position in the circumferential direction, and whose variation of the magnetism is slight in the circumferential direction. Another object of the present invention is to provide a manufacturing method for manufacturing the before described encoder.

The present invention has solved the above-described problems by using a ring shaped rubber compound comprised of unvulcanized rubber into which magnetic powders are mixed and having a thickness of 1.5 times to 5 times thicker than the thickness of an encoder, which is finally produced from the said ring shaped rubber, and the said ring shaped rubber compound is hot-pressed, and vulcanizingly molded as follows. The said ring shaped rubber compound is heat compressed by using upper mold and lower mold, which pressing the said ring shaped rubber compound in the axial direction, thereby its thickness is reduced to one fifth (⅕) to two thirds (⅔), and it is flown uniformly in a large amount in the radial direction of the said ring shaped rubber compound under a high temperature.

The manufacturing steps of the present invention will be separated into each step, and described in detail with reference to the drawings as follows.

The present invention provides an encoder made of rubber material and having a magnetism for forming a pulse train and generating a signal by the magnetic force showing an example in FIG. 6, also the present invention provides its manufacturing method.

In a method that the present invention provides, first, unvulcanized rubber into which the magnetic powders are mixed is formed into a sheet shaped rubber compound having a predetermined thickness using a roller or an extruder. Alternatively, the said sheet shaped rubber compound having a predetermined thickness can be formed by extruding the said unvulcanized rubber by extruder, and then rolling an extrusion-molded unvulcanized rubber by roller.

Now, the predetermined thickness as the before described means that the thickness t1 (as shown in FIG. 1) of the sheet shaped rubber compound is 1.5 times to 5 times thicker than a thickness t (as shown in FIG. 4) of the encoder made of rubber material and having a magnetism which is the final product.

It should be noted that it is preferable that, in this step, a sheet shaped rubber compound is formed while the directional orientation of the magnetic powders is arranged. According to the present invention, the final product of the encoder made of rubber material is manufactured, succeeding to the before described step of forming a sheet shaped rubber compound having a predetermined thickness, by cutting out a ring shaped rubber compound from the said sheet shaped rubber compound, hot-pressing and vulcanizingly molding the said ring shaped rubber compound, and magnetizing the S-poles and the N-poles alternately in circumference onto the said vulcanizingly molded ring, which are explained in detail in the following.

In the before described step of forming a sheet shaped rubber compound having a predetermined thickness, if the directional orientation of the mixed magnetic powders in the unvulcanized rubber is arranged, such as regulated, a variation, such as irregularity, of magnetism in the circumferential direction of the final product of encoder, which is manufactured by and through the succeeding steps as the before described, becomes smaller. So that, in the before described step of forming a sheet shaped rubber compound, it is preferable to form a sheet shaped rubber compound with arranging and regulating the directional orientation of magnetic powders in the unvulcanized rubber.

Next, from a sheet shaped rubber compound having the afore-mentioned thickness t1, a ring shaped rubber compound 1 as shown in FIG. 1 is cut out.

Subsequently, as shown in FIG. 2, the ring shaped rubber compound 1 is inputted into molds 2a and 2b, and as shown in FIG. 3, it is heated and compressed, and vulcanizingly molded in parallel by the molds 2a and 2b along with the direction of the central axis O, that is, in the directions shown by arrows X and Y.

The heating and compression at this step is performed in the temperature range of 150° C.–230° C. and in the pressure range of 1 MPa–200 Mpa. And the thickness of the ring shaped rubber compound 1 is reduced to one fifth ($\frac{1}{5}$) to two thirds ($\frac{2}{3}$) of the thickness t1 of the ring shaped rubber compound 1, that is the thickness t1 is reduced to the thickness t of the encoder made of rubber material 3 which is the final product.

Owing to this, the ring shaped rubber compound 1 is pressed under a high temperature, and flown uniformly in a large amount in the radial direction of the ring shaped rubber compound 1 as shown by arrows Z and W in FIG. 1, and then formed.

Next, onto this vulcanizingly molded one, shown by the reference numeral 3 in FIG. 3, although it is not shown, the S-poles and the N-poles are alternately magnetized in circumference, and the encoder 3 as shown in FIG. 4 which is made of rubber material and having a magnetism, which is the final product, is obtained.

Thus, in a manufacturing method of the present invention, the ring shaped rubber compound 1 having the predetermined thickness (thickness corresponding to 1.5 times to 5 times of the thickness t of the encoder 3 made of rubber material which is the final product) is subjected to be compressed under a high temperature and pressed into a thickness of $\frac{1}{5}$–$\frac{2}{3}$ of the thickness of ring shaped rubber compound. In this hot-pressing step, the ring shaped rubber compound is flown uniformly in a large amount in the radial direction shown by the arrows Z and W in FIG. 1, and then formed. Owing to this, even if there is uneven blending of the magnetic powders in the circumferential direction in the state of the ring shaped rubber compound 1, it can be removed in the step that the thickness of ring shaped rubber compound is reduced to $\frac{1}{5}$–$\frac{2}{3}$ by the before described compression step under a high temperature. Moreover, even if there are an engaged bubble and/or wrinkle in the ring shaped rubber compound, or any variation and/or irregularity of the thickness or the like in the ring shaped rubber compound, they are also removed by this compression step under a high temperature.

Therefore, an encoder made of rubber material and having an excellent performance which can exert powerful magnetic forces, and approximately uniform magnetic forces at any position in the circumferential direction, is manufactured by magnetizing the N-poles and the S-poles alternately in circumference onto the vulcanizingly molded ring, which has been obtained by hot-pressing the ring shaped rubber compound and reducing its thickness to one fifth ($\frac{1}{5}$) to two thirds ($\frac{2}{3}$) as the before described.

An encoder made of rubber material and having a magnetism provided by the present invention is manufactured by the manufacturing method described above.

As described above, it is preferable to set the thickness t1 of the ring shaped rubber compound, which is identical with the thickness of the sheet shaped rubber compound (unvulcanized rubber) at the range between 1.5 times to 5 times thicker than the thickness t of the encoder made of rubber material, which is the final product, and to heat compress and vulcanizingly mold the said ring shaped rubber compound reducing its thickness to one fifth ($\frac{1}{5}$) to two thirds ($\frac{2}{3}$), in order to obtain and manufacture the encoder made of rubber material and having an excellent performance such as exerting powerful magnetic forces, and approximately uniform magnetic forces at any position in the circumferential direction when magnetizing the N-poles and S-poles alternately in circumference onto the vulcanizingly molded one.

It should be noted that if necessary, when the ring shaped rubber compound 1 is molded with heating and compression, a reinforcing ring 4 consisted of metals or the like as shown in FIG. 2, FIG. 3, FIG. 4, and FIG. 6 can be also inputted within the mold 2, and vulcanized and adhered at the same time.

As described above, according to the present invention, it can provide an encoder made of rubber material and having a magnetism, when the S-poles and N-poles are alternately magnetized in the circumferential direction, whose magnetic force is strong and which exerts approximately uniform magnetic force at any position in the circumferential direction and whose variation or irregularity of the magnetism is slight in the circumferential direction.

DESCRIPTION OF THE PREFERRED EMBODIMENTS

Hereinafter, the preferred examples of the present invention will be described further in detail.

In a manufacturing method of the present invention, unvulcanizined rubber into which magnetic powders are mixed can be prepared by blending the magnetic powders into a polymer such as NBR (acrylonitrile-butadiene rubber) or ACM (acrylic acid ester co-polymer) or H-NBR (hydrogenation acrylonitrile-butadiene rubber) or FKM (fluorine rubber), and mixing with a rubber agent.

Now, as a magnetic powder, for example, ferrite can be employed.

It is desirable that a blending ratio of the magnetic powders is set to 70%–98% by weight. If the mixing ratio of the magnetic powders is less than 70% by weight, it is not preferable because the magnetic force of the final product (encoder made of rubber material and having a magnetism) is insufficient, and to the contrary, if it is more than 98% by weight, it is not preferable because the unvulcanized rubber is too hardened, and the processing ability becomes poor.

Upon forming unvulcanized rubber, into which the magnetic powders such as ferrite or the like is mixed, to a sheet shaped rubber compound, it is preferable as described above that the arrangement of the magnetic powders is to be orientated, that is, that the magnetic powders are to be arranged and orientated in a formed sheet shaped rubber compound. So that, it is preferable to form a sheet shaped rubber compound having the before described thickness t1 using anyone of the following steps.

Figure 4:
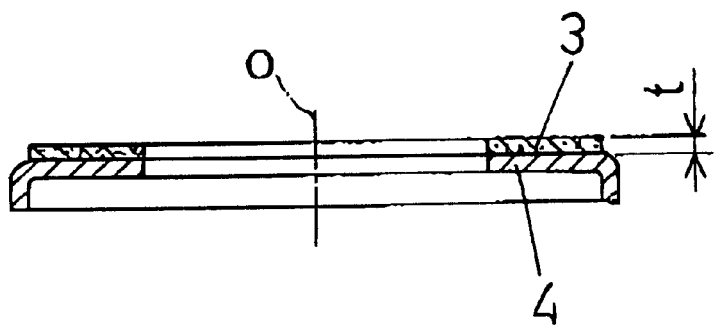
FIG. 4 is a sectional view showing an example of an encoder made of rubber material of the present invention.

In the case where a sheet shaped rubber compound is formed using a roller, it is preferable that a rubber raw material in a state of being unvulcanized into which the magnetic powders are mixed is in turn passed through a plurality of rollers, gradually made into a sheet and formed into a sheet shaped rubber compound having a thickness t1 (FIG. 1) of 1.5–5 times of the thickness t (FIG. 4) of the encoder made of rubber material which is the final product.

In this case, it is preferable to process it so that the sheet shaped rubber compound has the afore-mentioned thickness t1 by passing more than two times through a plurality of rollers, rather than forming the sheet shaped rubber compound having the afore-mentioned thickness t1 only by one passing through roller.

In the case where an extruder is employed, it is preferable to form a sheet shaped rubber compound having the before described thickness t1 by extrusion-molding using an extruder having a simplified shape outlet such as a plane shaped outlet.

Alternatively, in the case where an extruder is employed as the before described, after it is extrusion-molded by an extruder having a simplified shape such as a plane shaped outlet or a round shaped outlet into a plate shaped or thread shaped, it can be formed into a sheet shaped rubber compound having the afore-mentioned thickness t1 by rolling the said plate shaped or thread shaped extruded rubber compound at least one passing through roller.

Figure 1:
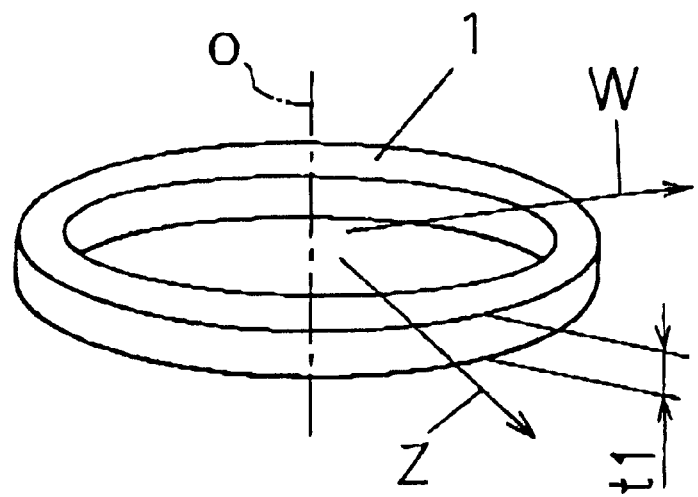
FIG. 1 is a perspective view showing a ring shaped rubber compound cut out from a sheet shaped rubber compound in a manufacturing method of the present invention.

The ring shaped rubber compound 1 as shown in FIG. 1 is formed from the sheet shaped rubber compound, which has been formed as the before described, by and through the following steps, for example. The ring shaped rubber compound 1 is trimmed from the sheet shaped rubber compound by using trimming die and putting the said trimming die to the sheet shapes rubber compound from a plane direction.

Alternatively, the ring shaped rubber compound 1 as shown in FIG. 1 can be formed by cutting it out from the sheet shaped rubber compound, which has been formed as the before described, in the desired size.

Figure 2:
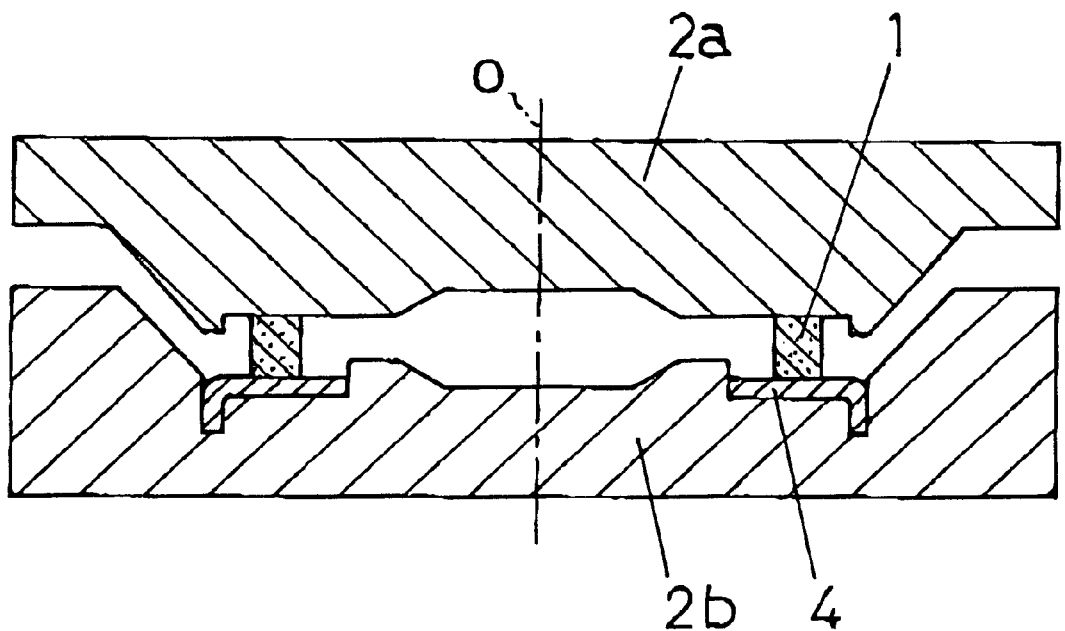
FIG. 2 is a sectional view showing a state where a ring shaped rubber compound is inputted into a mold in a manufacturing method of the present invention.

The ring shaped rubber compound 1 formed as described above is inputted within the molds 2a and 2b. If necessary, the ring shaped rubber compound 1 formed as described above is inputted within the molds 2a and 2b with the reinforcing ring 4 as shown in FIG. 2.

Figure 3:
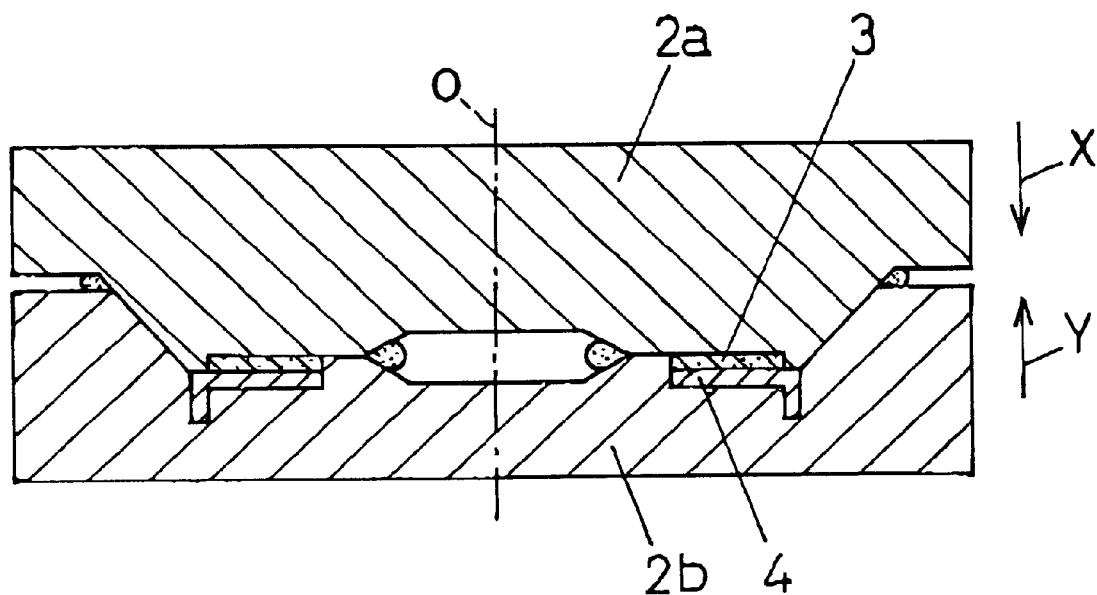
FIG. 3 is a sectional view showing a state where a ring shaped rubber compound was heated and compressed.

Then, as shown by the arrows X and Y in FIG. 3, it is heat compressed in the axial direction along with the direction of the center axis O, so that its thickness is reduced to be one fifth (⅕) to two thirds (⅔), and it is flown and vulcanizingly molded.

At that time, if the ring shaped rubber compound 1 was inputted within the molds 2a and 2b with the reinforcing ring 4, the said ring shaped rubber compound 1 and reinforcing ring 4 are adhered at the same time. At this time, the heat compression is performed in the temperature range of 150° C.–230° C. and in the pressure range of 1 MPa–200 MPa.

Subsequently, the encoder made of rubber material 3 (FIG. 4) is obtained by magnetizing the S-poles and the N-poles alternately in circumference onto this vulcanizingly molded one.

This encoder made of rubber material 3 is strong at the magnetic force, and exerts approximately uniform magnetic force at any position in the circumferential direction, and its variation of the magnetism is slight at any position in the circumferential direction.

Figure 6:
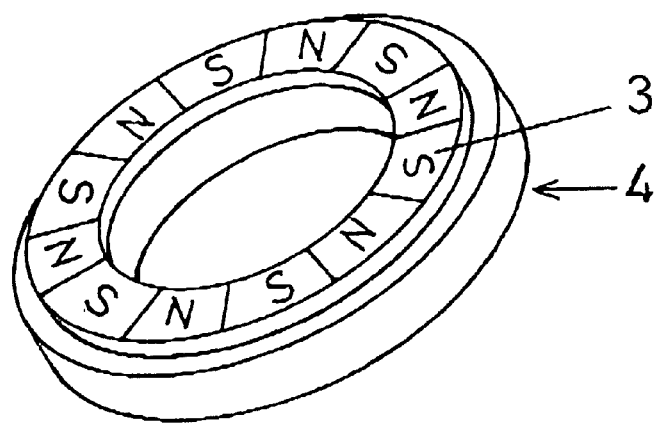
FIG. 6 is a perspective view showing the other preferred example of an encoder made of rubber material of the present invention.

It should be noted that in the manufacturing method of an encoder made of rubber material and having a magnetism according to the present invention described above, an encoder made of rubber material is formed on the flange portion of the reinforcing ring 4, as shown in FIG. 6, by employing the molds 2a and 2b as shown in FIG. 2 and FIG. 3.

Figure 5:
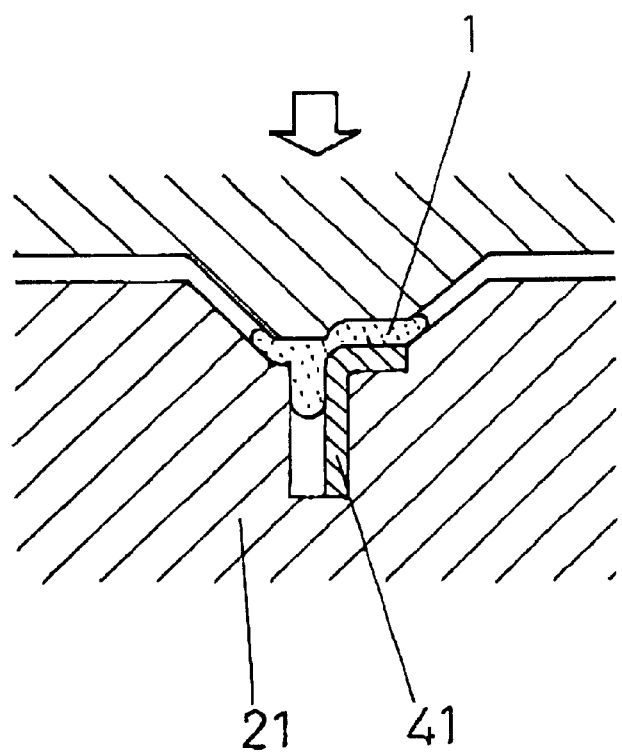
FIG. 5 is a sectional view showing the other state where a ring shaped rubber compound is heated and compressed in a manufacturing method of the present invention.

FIG. 5 shows a manufacturing method of an encoder made of rubber material and having a magnetism according to the present invention in which the reinforcing ring 41 having a cylindrical part is employed and the encoder made of rubber material of the present invention is provided and arranged cylindrically onto the outer surface of the said cylindrical part of reinforcing ring 41 in the axial direction.

In this case, an upper mold and a lower mold in a shape as shown in FIG. 5 are employed. In this case, even if a mold cavity of the mold 21 is in a deep channel shape, since similar to the afore-mentioned example, the ring shaped rubber compound 1 is heated and compressed under a high temperature and pressed, and flown and vulcanizingly molded, the magnetic powders within the ring shaped rubber compound 1 is flown in a certain arrangement with the directional orientation into the mold cavity and filled within the mold cavity.

Although the present invention has been described in connection with the particular preferred embodiments by referring to the accompanying drawings, it should be understood that the present invention is not limited to those embodiments, but various changes and modifications may be made without departing from the true spirit and scope of the invention as defined in the appended claims.

For example, in the embodiment described so far, the unvulcanized rubber is prepared to include ferrites as the magnetic powders. This is because ferrites are available at low cost, are capable of retaining the magnetism when they are magnetized, and can be treated easily when the rolling or extruding process takes place. Any other types of magnetic materials that meet the above requirements may also be used.

And, in the afore-mentioned examples, when the ring shaped rubber compound 1 is hot-pressed, and vulcanizingly molded, the reinforcing ring 4 consisted of metals or the like is also inputted within the mold 2 and vulcanizingly adhered at the same time. In this case, the reinforcing ring 4 is used for the purpose of providing the mechanical strength for the finished encoder made of rubber material and having a magnetism according to the present invention. Hence, after only the ring shaped rubber compound 1 is inputted into the mold 2 and hot-pressed, and further vulcanizingly molded, this vulcanizingly molded one may be adhered by adhering it on the flange section of the reinforcing ring 4.

What is claimed is:

1. A method for manufacturing a magnetic encoder, comprising:

providing a mixture of magnetic powder and unvulcanized raw rubber;

forming said mixture of said magnetic powder and said unvulcanized raw rubber into a sheet having a predetermined thickness;

removing an annular member, having said predetermined thickness, from said sheet;

applying compressive forces and heat to said annular member, thereby vulcanizing the rubber of said annular member and reducing the thickness of said annular member to a thickness that is from $1/5$ to $2/3$ said predetermined thickness; and then magnetizing said annular member such that S poles and N poles are alternately arranged around a circumference of said annular member.

2. The method according to claim 1, wherein
   forming said mixture into a sheet comprises one of
   (i) passing said mixture through a rolling machine, and
   (ii) passing said mixture through an extruding machine.

3. The method according to claim 2, wherein
   removing an annular member from said sheet comprises cutting said annular member from said sheet.

4. The method according to claim 3, wherein
   applying compressive forces and heat to said annular member comprises placing said annular member in a mold and then operating said mold.

5. A magnetic encoder manufactured according to the method of claim 4.

6. A magnetic encoder manufactured according to the method of claim 2.

7. The method according to claim 2, wherein
   applying compressive forces and heat to said annular member comprises placing said annular member in a mold and then operating said mold.

8. The method according to claim 1, wherein
   forming said mixture into a sheet comprises passing said mixture through an extruding machine and then passing said mixture through a rolling machine.

9. The method according to claim 8, wherein
   removing an annular member from said sheet comprises cutting said annular member from said sheet.

10. The method according to claim 9, wherein
    applying compressive forces and heat to said annular member comprises placing said annular member in a mold and then operating said mold.

11. A magnetic encoder manufactured according to the method of claim 10.

12. A magnetic encoder manufactured according to the method of claim 8.

13. The method according to claim 8, wherein
    applying compressive forces and heat to said annular member comprises placing said annular member in a mold and then operating said mold.

14. The method according to claim 1, wherein
    removing an annular member from said sheet comprises cutting said annular member from said sheet.

15. The method according to claim 14, wherein
    applying compressive forces and heat to said annular member comprises placing said annular member in a mold and then operating said mold.

16. The method according to claim 1, wherein
    applying compressive forces and heat to said annular member comprises placing said annular member in a mold and then operating said mold.

17. A magnetic encoder manufactured according to the method of claim 1.

* * * * *